June 5, 1962  J. R. MOWERY, JR., ET AL  3,038,109
BRAKING SYSTEMS FOR ELECTRICAL MOTORS
Filed Dec. 9, 1959

INVENTORS
JESSE R. MOWERY, JR.
CHRISTIAN B. ZIMMERMAN
BY
Bradley Cohn
ATTORNEY

United States Patent Office 3,038,109
Patented June 5, 1962

3,038,109
BRAKING SYSTEMS FOR ELECTRICAL MOTORS
Jesse R. Mowery, Jr., and Christian B. Zimmerman, Lancaster, Pa., assignors, by mesne assignments, to DeWalt, Inc., a corporation of Delaware
Filed Dec. 9, 1959, Ser. No. 858,432
3 Claims. (Cl. 318—209)

This invention relates to rotary electrical motors and more particularly to a novel and improved braking system for such motors.

Rotary electrical motors for many industrial applications are designed to operate at a relatively high speed and it is frequently desirable to provide the motor with braking means to bring the motor to a standstill condition quickly after the motor is de-energized. While many types of mechanical brakes have been provided for electrical motors, it is often impractical to employ a mechanical braking action when the rotational speed of the motor is still relatively high. On the other hand, it is undesirable to wait for the motor to "coast" to a speed sufficiently low to make mechanical braking feasible.

It is also well known to employ various kinds of dynamic braking systems for electrical motors, such systems frequently being of the type providing a braking action which begins promptly after the supply of current to the motor is interrupted and decreases in effectiveness as the speed of the motor decreases. Such dynamic braking systems are convenient but have the disadvantage that they are incapable of rapidly bringing the motor to a standstill condition.

A general object of the invention is to devise an improved braking system for electrical motors, said braking system including both dynamic braking means and mechanical braking means in such fashion that the mechanical braking means is brought into action at a time when the effectiveness of the dynamic braking means has fallen to a relatively low level.

A more specific object is to provide a combined dynamic brake and centrifugally controlled friction brake for electrical motors in such manner that the friction brake is held inactive by centrifugal action so long as the speed of the motor is sufficiently high to allow effective operation of the dynamic brake.

Another object is to provide, for use in such a braking system, an improved centrifugally activated brake.

In order that the manner in which these and other objects are attained, in accordance with the invention, can be understood in detail, reference is had to the accompanying drawings, which form a part of this specification, and wherein.

Figure 1:
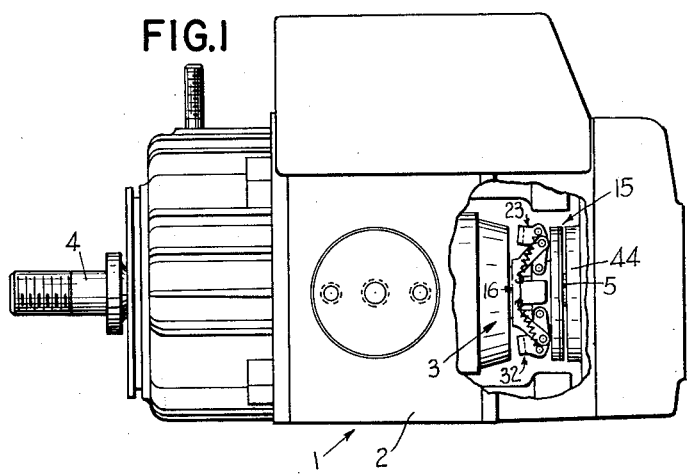
FIG. 1 is a side elevational view, with portions broken away for clarity, of an electrical motor equipped with a braking system constructed in accordance with one embodiment of the invention.

Referring now to the drawings in detail, the invention is illustrated as applied to a conventional single phase A.C. motor 1 having a housing 2 and a rotor indicated generally at 3. The rotor is of conventional construction, there being an output shaft 4 at one end and a shaft portion 5 at the other. Shaft 4 and portion 5 can be portions of a single rotor shaft, or separate appropriately interconnected shaft elements. Output shaft 4 is threaded or otherwise suitably adapted for connection to any suitable device to be driven such, for example, as a rotary saw blade (not shown).

Figure 4:
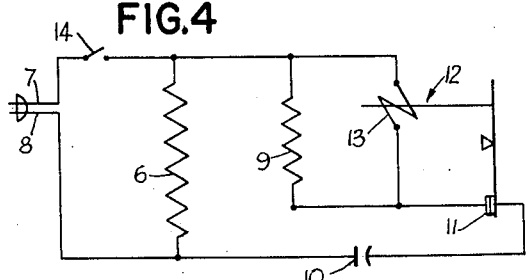
FIG. 4 is a schematic circuit diagram of the device of FIG. 1.

As illustrated diagrammatically in FIG. 4, the electrical circuit of the motor 1 includes a running winding 6 connected across conductors 7 and 8 of the usual power cord, and a starting winding 9 and a capacitor 10 arranged to be connected in series combination across the running winding 6 by the action of the normally closed contacts 11 of an electromagnetic relay 12. The actuating winding 13 of relay 12 is connected across starting winding 9.

The circuit just described is conventional, operating in the manner discussed, for example, in U.S. Patent 1,944,090, issued January 16, 1934, to Lukens. When conductors 7 and 8 are first connected to an A.C. power source, the voltage drop across the starting winding is not sufficient to energize relay 12, contacts 11 are therefore closed, and the series combination of the starting winding and capacitor is accordingly connected across the running winding. As the motor reaches its running speed, the voltage across the starting winding becomes sufficiently large to energize winding 13 of the relay, and contacts 11 are opened to remove the starting winding and capacitor from the circuit. When the supply of power to the motor is interrupted, as by opening switch 14, relay 12 is again de-energized, closing contacts 11, and thus completing a dynamic braking circuit including, in series, the running winding 6, the starting winding 9 and the capacitor 10.

Such series circuit is completed at a time when the motor is still rotating substantially at its running speed. Accordingly, the residual flux in the rotor generates a voltage in the starting winding, which voltage loads capacitor 10. The stored energy of the rotor is dissipated through such generating action, the motor thus being braked dynamically from running speed to a lower speed.

Thus, if the running speed is 3450 r.p.m., for example, such a dynamic braking circuit can be readily designed to dynamically brake the motor quickly to about 1500 r.p.m. Below such lower speed, however, the effectiveness of the dynamic braking circuit rapidly decreases so that, if it is desired to bring the motor quickly to standstill condition, the dynamic braking action alone is not satisfactory.

Working in conjunction with the dynamic braking means, in such fashion as to be brought into action when the effectiveness of the dynamic braking action begins rapidly to decrease, is a centrifugally controlled friction brake indicated generally at 15. Brake 15 includes a support member 16 rigidly affixed to shaft portion 5 for rotation therewith and including a flat, plate-like, generally rectangular portion 17 disposed in a plane transverse to the axis of rotation of shaft portion 5. Portion 17 has a central circular opening in which one end of a sleeve 18 is disposed, such end of the sleeve being upset to effect a rigid connection between the sleeve and portion 18, and the sleeve being fixed to the shaft portion 5, as by a press fit, so that rotary motion of the shaft portion is transmitted to support member 16.

At one end of portion 17, member 16 includes a pair of spaced, parallel arms 19 formed integrally with portion 17, one at each side thereof, the arms 19 extending generally outwardly of shaft portion 5 and slanting away from the rotor. At its other end, portion 17 is similarly provided with a corresponding pair of arms 20, arms 19 being opposed across shaft portion 5 with respect to arms 20. A pivot pin 21 extends between and is rigidly secured to the outer end portions of arms 19. A second pivot pin 22 is similarly fixed to the end portions of arms 20.

Journaled on pin 21 for pivotal movement about the axis thereof is a lever assembly 23 comprising spaced, parallel side arms 24 disposed between arms 19, each side arm 24 being adjacent a different arm 19. Each side arm 24 includes an outer portion 25, extended generally toward rotor 3, and an inwardly disposed portion 26, extending toward shaft portion 5. Fixed to and extending between portions 25 of side arms 24 is a relatively thick cross bar 27, effective as a counterweight. Fixed to and extending between the free ends of portions 26 of side arms 24 is a cylindrical pin 28. Pivot pin 21, cross bar 27 and pin 28 are mutually parallel, all extending transversely at right angles to the axis of rotation of shaft portion 5.

A pin 29 extends through suitable opposed openings in side arms 24, being secured rigidly to the side arms in any suitable manner, and projects beyond each side arm. Portion 17 of support member 16 is provided with a pair of lateral ears 30, opposed diametrically across shaft portion 5 at the minor axis of portion 17, each ear 30 being provided with an aperture. Two helical biasing springs 31 are provided, each connected in tension between portion 17 and lever assembly 23 to bias the lever assembly in a direction moving counterweight 27 toward shaft portion 5 and cylindrical pin 28 generally away from the rotor 3. Thus, each spring 31 has hooked ends, one end of each spring being engaged over a different one of the projecting ends of pin 29 and the other end of each spring being hooked in the aperture of a different one of ears 30.

It will be noted that the form of each side arm 24 is, in side elevation, generally like a bell crank lever so that limited pivotal movement of lever assembly 23 about the axis of pin 21 causes movement of counterweight 27 generally toward and away from shaft portion 5 and movement of pin 28 generally lengthwise of the shaft portion.

Journaled on pin 22 for pivotal movement about the axis thereof is a second lever assembly 32, identical with lever assembly 23. Lever assembly 32 includes a counterweight 33, a cylindrical pin 34, and a pin 35, identical with elements 27, 28 and 29, respectively, of assembly 23. Tension springs 36 are provided to bias lever assembly 32 in a manner identical to that described with reference to springs 31.

Figure 3:
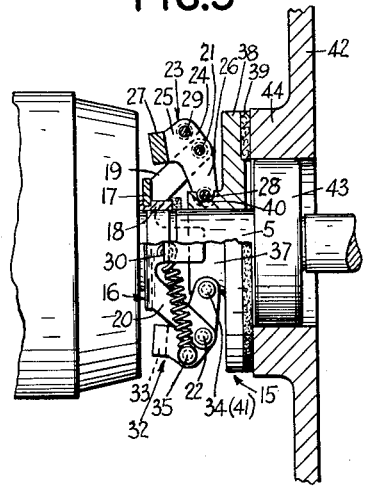
FIG. 3 is a view similar to FIG. 2 but showing such parts in braking position.
Figure 5:
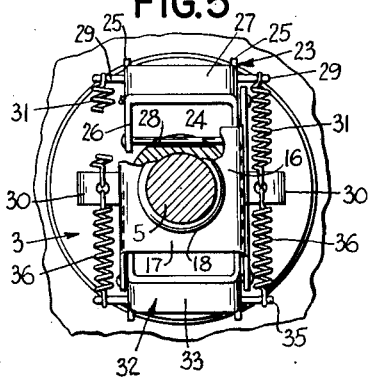
FIG. 5 is a transverse sectional view taken on line 5—5, FIG. 2.

Loosely surrounding shaft portion 5, on the side of support member 16 opposite rotor 3, is a generally cylindrical collar 37 having formed integrally therewith an annular, flat braking member 38 disposed in a plane at right angles to the axis of rotation of shaft portion 5. The face of member 38 directed away from rotor 3 is equipped with an annulus of friction material 39. In areas which are diametrically opposed across the cylindrical body of the collar, collar 37 is provided with a pair of straight, outwardly opening grooves 40, 41 extending transversely of shaft portion 5 at right angles thereto. Thus, grooves 40, 41 can be considered as tangential to an imaginary circle within the body of the collar and concentric with the axis thereof, the points of tangency being at opposite ends of a diameter of the circle. Grooves 40 and 41 are each of generally U-shaped transverse cross-section and are somewhat wider, as seen in FIG. 3, than the cross-sectional diameter of pins 28 and 34.

Cylindrical pin 28, carried by side arms 24 of lever assembly 23, is engaged in and extends throughout the length of groove 40. The corresponding pin 34 of lever assembly 32 is engaged in and extends throughout the length of groove 41. Such engagement of pins 28 and 32 in the grooves of collar 37 is effective not only to transmit pivotal movement of lever assemblies 23, 32 into axial movement of collar 37, and thus of braking member 38, but also to lock the collar and braking member against rotation relative to shaft portion 5, so eliminating the necessity of having the collar slidably keyed to shaft portion 5.

The free end of shaft portion 5 is bearinged in end wall 42 of housing 2, as by a ball bearing 43 mounted in an annular wall portion 44 which is considerably thicker, in the direction of the axis of shaft portion 5, than is the main portion of wall 42. The end of wall portion 44 directed toward rotor 3 is formed as a plane face disposed parallel to the annulus of friction material 39. Thus, wall portion 44 constitutes a fixed braking member into contact with which friction material 39 can be brought by movement of collar 37 axially away from rotor 3.

Figure 2:
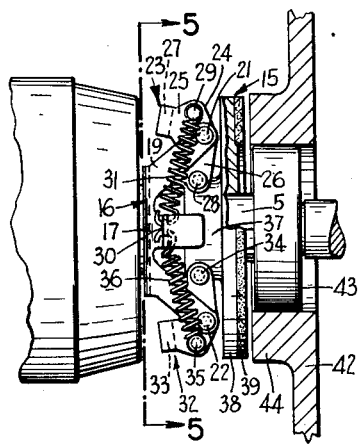
FIG. 2 is a fragmentary view, enlarged in scale and with some parts shown in vertical longitudinal section and others in side elevation, of the device of FIG. 1, certain parts being illustrated in non-braking position.

Lever assemblies 23 and 32 are so proportioned, and the strength of springs 31 and 36 so chosen, that, by centrifugal action due to counterweights 27 and 33, the lever assemblies are held in positions such as those seen in FIG. 2 so long as the motor is at running speed or at a lower speed within a range for which the dynamic braking means of FIG. 4 provides an effective braking action. As the speed of the motor falls below a predetermined value at which the effect of the dynamic braking means of FIG. 4 begins to decrease rapidly, the biasing force of springs 31 and 36 predominates over the opposing centrifugal force provided by counterweights 27 and 33. Lever assemblies 23 and 32 are thus pivoted simultaneously in directions moving pins 28 and 34 toward wall portion 44. Accordingly, because of the engagement of pins 28 and 34 in grooves 40 and 41, collar 37 is shifted axially toward wall portion 44, bringing friction facing 39 into engagement with the adjacent end face of wall portion 44. Since pins 28 and 34, because of their engagement in grooves 40 and 41, prevent relative rotation between collar 37 and shaft portion 5, such engagement of friction facing 39 with fixed wall portion 44 is effective to brake the motor. As the speed of the motor decreases, springs 31 and 36 urge friction material 39 against wall portion 44 with increasing force, since the centrifugal force on counterweights 27 and 33 decreases, and the motor is braked rapidly to standstill condition.

In typical applications, the dynamic braking means of FIG. 4 remains satisfactorily effective during a period in which on the order of ¾ of the kinetic energy of rotation of the motor is absorbed, and the centrifugally controlled friction brake then acts to absorb the remaining energy of rotation, completing its braking action in a small fraction of the time which would have been required had continued dependence been placed on the dynamic braking means.

When the motor is started, the friction brake being then in its normally engaged condition, the power of the motor with starting winding 9 actively connected, is adequate to overcome the braking action of the friction brake. With the centrifugal actuating means of the friction brake designed to maintain the brake in inactive condition for speeds high enough for satisfactory operation of the dynamic braking means, the centrifugal actuating means releases the friction brake fully, during starting of the motor, before relay 12 is energized to disconnect the starting winding.

While a particularly advantageous embodiment of the invention has been shown and described for illustrative purposes, it is to be understood that various changes and modifications, particularly in the specific nature of the dynamic and frictional braking means, can be made without departing from the scope of the invention as defined in the appended claims.

We claim:
1. In a braking system for a rotary electrical motor, the combination of electrical means operatively associated with the motor to dynamically brake the same from the running speed to a lower speed, centrifugal means mounted on a rotary part of the motor, and mechanical brake means operatively arranged to brake the motor, said centrifugal means being connected to said mechanical brake means to actuate the same to braking condition upon occurrence of such lower speed and said mechanical means being effective when so actuated to brake the motor to a standstill condition.

2. In combination with a rotary electrical motor having a running winding and a starting winding, a compound braking system comprising (1) dynamic braking means including capacitive means and means responsive to the interruption of supply current to the motor for connecting said capacitive means to said windings to complete a dynamic braking circuit, and (2) centrifugal braking means comprising a friction brake operatively arranged to brake the motor to a standstill condition when actuated, and a centrifugal actuator mounted on a rotary part of the motor and connected to said friction brake to actuate the same to braking condition in response to occurrence of a predetermined rotational speed of said motor, which predetermined speed is substantially less than the normal running speed of the motor.

3. In a rotary electrical motor, the combination of a starting winding; a running winding; a capacitor; electrical means operative to connect said windings and capacitor to form starting circuit and to connect said windings and capacitor in series when the supply of current to the motor is interrupted, such series connection causing a dynamic braking of the motor which decreases in magnitude as the speed of the motor decreases; and a friction brake comprising a first friction member carried by a fixed part of the motor, a second friction member mounted on a rotary part of the motor for rotation therewith and movable from an inactive position into and out of braking engagement with said first friction member, resilient means connected to said second friction member and effective to bias the same toward said first friction member, and centrifugal means operatively arranged to oppose said resilient means, said centrifugal means being effective to hold said second friction member in said inactive position so long as the motor is operating above a predetermined rotational speed substantially less than the running speed of the motor, the motor having sufficient power to overcome said friction brake upon starting of the motor with said starting circuit completed.

References Cited in the file of this patent

UNITED STATES PATENTS

| | | |
|---|---|---|
| 1,327,789 | Storer | Jan. 13, 1920 |
| 1,818,655 | Summerfield | Aug. 11, 1931 |
| 2,194,759 | Logan | Mar. 26, 1940 |
| 2,353,942 | Stephenson | July 18, 1944 |